United States Patent [19]

Meissner et al.

[11] Patent Number: 5,437,708
[45] Date of Patent: Aug. 1, 1995

[54] IRON CARBIDE PRODUCTION IN SHAFT FURNACE

[75] Inventors: David C. Meissner; Winston L. Tennies, both of Charlotte, N.C.

[73] Assignee: Midrex International B.V. Rotterdam, Zurich Branch, Zurich, Switzerland

[21] Appl. No.: 237,786

[22] Filed: May 4, 1994

[51] Int. Cl.[6] .................... C21B 13/02; F27D 17/00
[52] U.S. Cl. ......................... 75/490; 75/496; 266/140
[58] Field of Search ............... 75/490, 496; 266/155–157, 140, 144, 186, 197

[56] References Cited

U.S. PATENT DOCUMENTS

| Re. 32,247 | 9/1986 | Stephens, Jr. | 75/11 |
|---|---|---|---|
| 3,764,123 | 10/1973 | Beggs | 266/140 |
| 3,836,131 | 9/1974 | Beggs | 266/140 |
| 3,899,569 | 8/1975 | Hunter et al. | 423/76 |
| 4,046,557 | 9/1977 | Beggs | 75/490 |
| 4,053,301 | 10/1977 | Stephens, Jr. | 75/11 |
| 4,111,687 | 9/1978 | Syska | 75/13 |
| 4,160,663 | 7/1979 | Hsieh | 75/35 |
| 4,212,452 | 7/1980 | Hsieh | 266/156 |
| 4,248,623 | 2/1981 | Papst | 75/490 |
| 4,396,423 | 8/1983 | Stephens, Jr. et al. | 75/25 |
| 4,416,688 | 11/1983 | Greenwalt | 75/6 |
| 5,061,326 | 10/1991 | Shoen | 148/124 |
| 5,073,194 | 12/1991 | Stephens et al. | 75/376 |
| 5,104,561 | 4/1992 | Kitamura et al. | 252/62.51 |
| 5,118,479 | 6/1992 | Stephens, Jr. et al. | 423/148 |
| 5,137,566 | 8/1992 | Stephens, Jr. et al. | 75/507 |
| 5,139,568 | 8/1992 | Geiger | 75/501 |

*Primary Examiner*—Peter D. Rosenberg
*Attorney, Agent, or Firm*—Ralph H. Dougherty

[57] ABSTRACT

A method and apparatus for the production of iron carbide in a shaft furnace, by reacting a carbon containing reducing gas as the process gas with particulate metal oxide material for an extended residence time at low temperature.

25 Claims, 2 Drawing Sheets

IRON CARBIDE PRODUCTION IN SHAFT FURNACE

FIELD OF THE INVENTION

The present invention relates to a method and apparatus for the production of iron carbide in a shaft furnace, and more particularly to a method of using carbon containing reducing gas as the process gas in a furnace for reaction with particulate metal oxide material.

BACKGROUND OF THE INVENTION

Direct reduction of iron oxides captured steelmakers' imaginations several centuries ago when they first realized how easily oxygen could be removed from its iron ore carrier through reduction with hydrogen and/or carbon monoxides. However, harnessing the simple chemical reactions in large scale commercial production proved elusive. Then the Midrex direct reduction process was developed which combines the technology of the shaft furnace and the gas generator in an economic direct reduction system operating continuously and using gaseous reductants produced from natural gas. While a small amount of iron carbide has always been a byproduct of the Midrex direct reduction process it generally accounted for less than two percent of the product.

DESCRIPTION OF THE PRIOR ART

Applicants are aware of the following related U.S. Patents concerning either iron carbide production or shaft furnace operation.

| U.S. Pat. No. | Issue Date | Inventor | Title |
|---|---|---|---|
| 4,111,687 | 09-05-1978 | Syska | PROCESS FOR THE PRODUCTION OF INTERMEDIATE HOT METAL |
| 4,160,663 | 07-10-1979 | Hsieh | METHOD FOR THE DIRECT REDUCTION OF IRON ORE |
| 4,212,452 | 07-15-1980 | Hsieh | APPARATUS FOR THE DIRECT REDUCTION OF IRON ORE |
| 3,899,569 | 08-12-1975 | Hunter | PREPARATION OF HIGHLY PURE TITANIUM TETRACHLORIDE FROM ILMENITE SLAG |
| 5,073,194 | 12-17-1991 | Stephens | PROCESS FOR CONTROLLING THE PRODUCT QUALITY IN THE CONVERSION OF REACTOR FEED INTO IRON CARBIDE |
| 5,061,326 | 10-29-1991 | Shoen | METHOD OF MAKING HIGH SILICON, LOW CARBON REGULAR GRAIN ORIENTED SILICON STEEL |
| 4,416,688 | 11-22-1983 | Greenwalt | DIRECT REDUCTION OF ORES AND CONCENTRATION OF METALLIC VALUES |
| 4,396,423 | 08-02-1983 | Stephens | PROCESS FOR RECOVERING IRON AND ZINC FROM STEEL MAKING DUSTS |
| 4,053,301 | 10-11-1977 | Stephens | PROCESS FOR THE DIRECT PRODUCTION OF STEEL |
| Re 32,247 | 09-16-1986 | Stephens | PROCESS FOR THE DIRECT PRODUCTION OF STEEL |
| 5,118,479 | 06-02-1992 | Stephens | PROCESS FOR USING FLUIDIZED BED REACTOR |
| 5,104,561 | 04-14-1992 | Kitamura | PROCESS FOR PREPARING CARBIDE FINE PARTICLES |
| 5,137,566 | 08-11-1992 | Stephens | PROCESS FOR PREHEATING IRON-CONTAINING REACTOR FEED PRIOR TO BEING TREATED IN A FLUIDIZED BED REACTOR |
| 5,139,568 | 08-18-1992 | Geiger | CONTINUOUS PRODUCTION OF IRON-CARBON ALLOY USING IRON CARBIDE |
| 3,764,123 | 10-09-1973 | Beggs | METHOD AND APPARATUS FOR REDUCING IRON OXIDE TO METALLIC IRON |
| 4,046,557 | 09-06-1977 | Beggs | METHOD FOR PRODUCING METALLIC IRON PARTICLES |

Syska U.S. Pat. No. 4,111,687 discusses the formation of 1 to 1.5 percent iron carbide by reducing metal oxide with a reducing gas of $H_2$ and CO mixed with recycled top gas.

Hsieh U.S. Pat. No. 4,160,663 discloses a process for the reduction of iron ore and shows a composition of reducing gas.

Hsieh U.S. Pat. No. 4,212,452 discloses a process for the reduction of iron ore and shows a composition of reducing gas.

Hunter U.S. Pat. No. 3,899,569 teaches the preparation of titanium tetrachloride from ilmenite slag.

Stephens U.S. Pat. No. 5,073,194 teaches process gases and reductants comprising $H_2O$, CO, $CO_2$, $H_2$, and $CH_4$.

Shoen U.S. Pat. No. 5,061,326 teaches a method of making silicon steel.

Greenwalt U.S. Pat. No. 4,416,688 teaches a process for beneficiating iron ore.

Stephens U.S. Pat. No. 4,396,423 discloses a process for recovering iron and zinc from steel making flue dust.

Stephens U.S. Pat. No. 4,053,301 was reissued as U.S. Pat. No. Re. 32,247.

Stephens U.S. Pat. No. Re. 32,247 discloses a process for the production of iron carbide and then steel is an oxygen or electric furnace using a reducing and carburizing gas of $H_2$, $CH_4$, CO, and $CO_2$.

Stephens U.S. Pat. No. 5,118,479 teaches a design for a fluidized bed reactor and also discloses the five constituent process gases.

Kitamura U.S. Pat. No. 5,104,561 discloses a process for preparing iron carbide fine particles and discloses various carburizing gases.

Stephens U.S. Pat. No. 5,137,566 teaches a process for the conversion of reactor feed material to iron carbide and discloses several process gas compositions.

Geiger U.S. Pat. No. 5,139,568 teaches a process for the production of an iron-carbon alloy.

Beggs U.S. Pat. No. 3,764,123 discusses the reduction of metal oxide to metallic iron using reducing gas comprising CO and $H_2$ at a temperature of 1300° to 1450° F. (704° to 788°). The removed top gas is used as a portion of the reducing gas.

Beggs U.S. Pat. No. 4,046,557 teaches a method of producing iron particles which reduces particulate material, with the spent reducing gas being removed and a portion of the spent reducing gas being introduced in a cooling zone and a portion of the cooling gas being introduced to the reducing zone.

SUMMARY OF THE INVENTION

The invention utilizes the Midrex method of direct reduction and further provides a method for using carbon-containing reducing gas as the process gas in a shaft furnace for the production of iron carbide. The Midrex method and apparatus for direct reduction is disclosed in U.S. Pat. No. 3,748,120 entitled "Method of Reducing Iron Oxide to Metallic Iron", U.S. Pat. No. 3,749,386 entitled "Method for Reducing Iron Oxides in a Gaseous Reduction Process", U.S. Pat. No. 3,764,123 entitled "Apparatus for Reducing Iron Oxide to Metallic Iron", U.S. Pat. No. 3,816,101 entitled "Method for Reducing Iron Oxides in a Gaseous Reduction Process", and U.S. Pat. No. 4,046,557 entitled "Method for Producing Metallic Iron Particles", which are hereby incorporated by reference. Applicants have invented an efficient process to produce iron carbide in a shaft furnace with no modification of the apparatus where the carbide carbon content is better than 5 to 6 percent. Carbon is added to the metallized product in the reducing zone as iron carbide derived from $CH_4$ and/or CO. The process gas, comprising CO, $CO_2$, $CH_4$, $H_2O$, and $H_2$ in specific proportions, is introduced into the furnace and flows upwardly through a downward gravitational flow of particulate metal oxide material. At a suitable temperature, the gas reacts with the metal oxide material to produce iron carbide and reaction gases. The metallized product is cooled by cooling gases introduced into the lower portion of the furnace. The reaction gases are removed from the top of the furnace and may be recycled and reintroduced into the furnace as reducing gas and/or cooling gas. The cooled, reduced metallized product is finally removed from the bottom of the furnace.

The removed reaction top gas is cooled, and a portion may be reintroduced into the furnace as a cooling gas, with the remainder being sent to a reformer for heating purposes or for recycling for reintroduction into the furnace as reducing gas. A portion of the cooling gas is removed from the furnace, but a portion is allowed to remain in the furnace to rise countercurrently through the metal oxide material and contribute to the reduction reactions. The portion of the cooling gas that is removed from the furnace is either cooled and reintroduced into the furnace as cooling gas or, in an alternative embodiment, is sent to the reformer for recycling and reintroduction into the furnace as reducing gas.

During normal operation of a shaft furnace utilizing the invented process, iron carbide is produced using the Midrex direct reduction process using the normal Midrex bustle gas, but the metal oxide material is maintained within the furnace at a lower temperature and contained within the furnace for a longer residence time than currently employed. Using the Midrex process gas in conjunction with the invented process, a product with 85% to 91% iron carbide ($Fe_3C$) is produced.

OBJECTS OF THE INVENTION

The principal object of the invention is to provide an improved method of the production of a high percentage of iron carbide ($Fe_3C$) in the direct reduction of iron.

A further object of this invention is to provide a method of production of iron carbide ($Fe_3C$) in a shaft furnace.

Another object of this invention is to provide a process for producing process gas for use in the production of iron carbide in a shaft furnace.

BRIEF DESCRIPTION OF THE DRAWINGS

The foregoing and other objects will become more readily apparent by referring to the following detailed description and the appended drawings in which.

DETAILED DESCRIPTION

Figure 1:
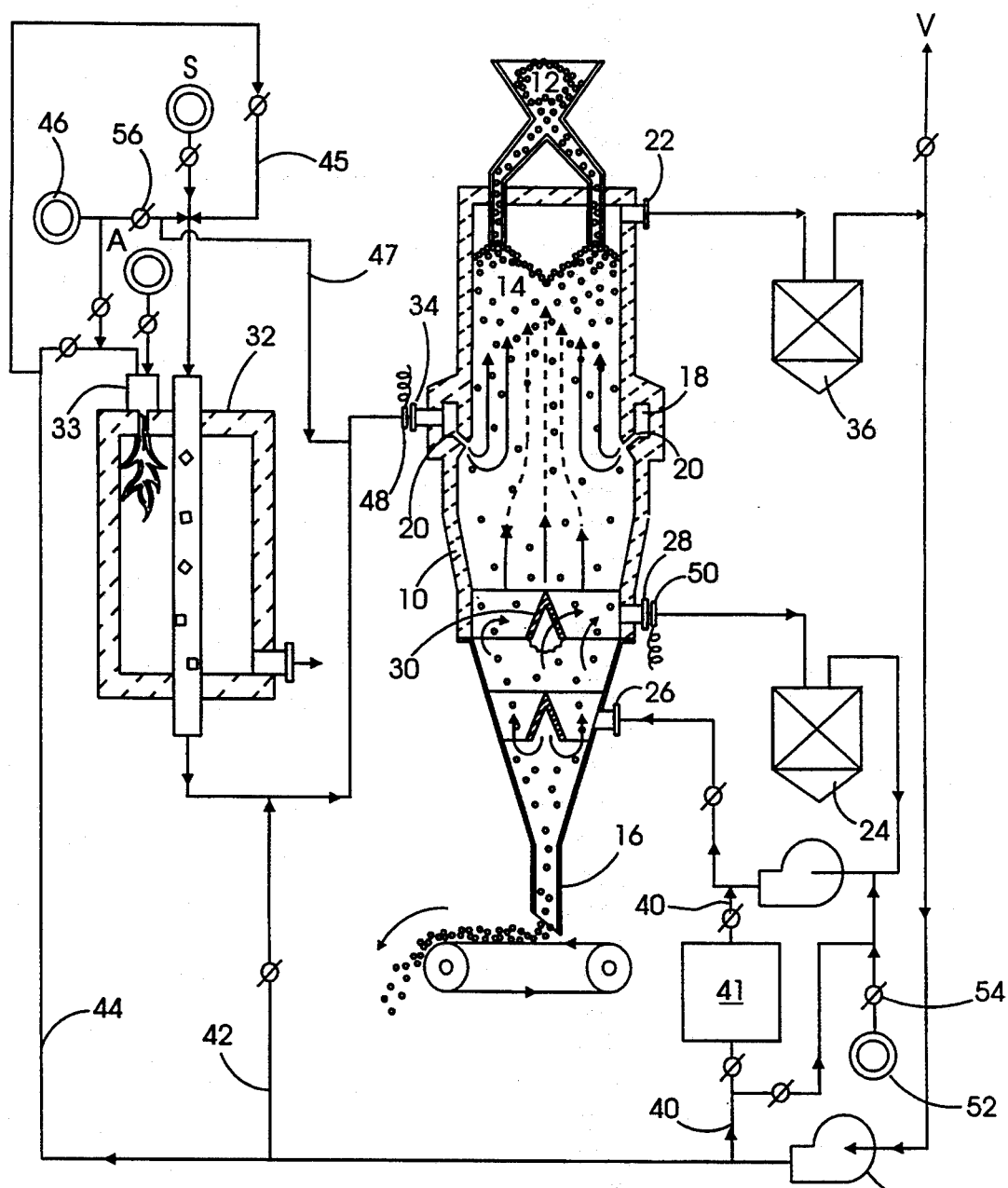
FIG. 1 is a schematic drawing of a vertical shaft furnace and its associated equipment showing a method of production of iron carbide in a shaft furnace.

Referring now to FIG. 1, the invented process uses the Midrex direct reduction method and apparatus disclosed in U.S. Pat. No. 4,046,557, "Method for Producing Metallic Iron Particles" with several modifications. Particulate metal oxide material is charged to a vertical shaft furnace 10 at its upper periphery. The furnace 10 has an upper reducing zone, a lower cooling zone, and a discharge pipe 16. The removal of the product through the discharge pipe 16 establishes the gravitational downward flow of the metal oxide material to form a bed, or burden 14, in the furnace. A reformer 32 generates a hot reducing gas which is introduced into the furnace via inlet 34 into a bustle 18 and tuyere system 20 near the reducing zone and flows upwardly through the burden 14. A heating means heats the reducing zone of the furnace to a sufficient temperature to allow the reducing gas to react with the metal oxide material. These reactions reduce the metal oxide to iron carbide. Top gases are also formed by these reactions and are removed from the upper portion of the furnace by spent top gas offtake pipe 22.

A cooling gas is introduced into the furnace at the cooling zone of the furnace through inlet 26 to cool the reduced metallized product before removal of the product from the bottom 16 of the furnace. The reacted removed top gas is cooled and cleaned by a scrubber/cooler 36, passes through compressor 38, and a portion of this cooled top gas is reintroduced into the furnace as a cooling gas through pipe 40. A carbon dioxide removal apparatus 41 can be provided in line with pipe 40. After the cooling gas is injected into the furnace and passes upwardly thourgh the burden, a portion of this gas is removed by a cooling gas collection member 30 and an outlet 28 at a location between the reducing and cooling zones. The portion of cooling gas that remains in the furnace flows upwardly and reacts with the metal oxide burden material to further facilitate carburization. The portion of the cooling gas that is removed from the furnace is passed through a scrubber/cooler 24 and is then reintroduced into the furnace as cooling gas through inlet 26.

Methane ($CH_4$) is added to the cooling gas from source 52 prior to its introduction into the cooling zone of the furnace. The cooling gas introduced through inlet 26 preferably contains approximately 20 to 50 percent $CH_4$ by volume. The amount of $CH_4$ added to the cooling gas from source 52 as well as the amount of methane added to the reducing gas from source 46 is regulated by a controlling means such as a programmable controller (which is omitted from the drawings for clarity) and valves 54 and 56. Sensors 48 and 50 detect the amount of $CH_4$ present in the reducing gas and cooling gas, respectively, and valves 56 and 54 are adjusted to allow a proper, predetermined level of $CH_4$ into the furnace at the proper locations. Reducing gas may be enriched at inlet 34 by methane from line 47.

A reformer furnace 32 accepts hydrocarbon gas from source 46, a portion of the cooled top gas through pipes 42, 44 and 45, and optionally steam from source S. The reformer outputs reducing gas in proper proportion into the furnace via inlet 34 at a predetermined temperature, preferably between 1150° and 1450° F. (621° to 788°).

Reformer Burner 33 is fueled with cleaned recycled top gas from line 44, methane from source 46, and combustion air from source A.

The temperature to which the reducing zone of the furnace is heated is approximately 1200° to about 1310° F. (about 650° to about 710° C.). Maximum conversion from iron oxide to iron carbide occurs around 1300° F. (704°) but falls off rapidly if the reducing zone temperature is increased to near normal reduction operating temperatures of around 1400° F. (760° C.). Current operating practice for direct reduction includes a residence time of the metal oxide burden material within the furnace of approximately 5 to 6 hours. To produce iron carbide in accordance with the present invention, burden residence time is from 9 to 15 hours with the preferred residence time being approximately 12 hours.

The bustle gas, or reducing gas, has five constituents which can interact either as gas/gas reactions or as gas/solid reactions. Some of these reactions liberate heat, i.e., are exothermic, and others consume heat, i.e., are endothermic. These reactable constituents are $CO$, $CO_2$, $CH_4$, $H_2$, and $H_2O$. The preferred proportions, by volume, of these constituents of the reducing gas are 36 percent $CO$, 5 percent $CO_2$, 4 percent $CH_4$, the balance being $H_2$ and a small amount of $H_2O$. Acceptable ranges for several of the reducing gas constituents include a $CO$ content of not less than 30 percent, a $CO_2$ content of 2 to 5 percent, and a $CH_4$ content of 2 to 5 percent. Hot direct reduced iron pellets are a good catalyst for the various gas/gas reactions, as well as for the gas/solid carburizing reactions. The carburizing potential of the gas is a function of gas temperature and the partial pressures of the five constituent gases.

The following table illustrates how the carburizing potential is temperature dependent as well as how over 85 percent iron carbide ($Fe_3C$) in the product is achieved utilizing the invented process. The Table lists data from tests performed on metal oxide pellets which were maintained at the temperatures and durations as shown, while being exposed to a reducing gas comprising, by volume, 36 percent $CO$, 5 percent $CO_2$, 4 percent $CH_4$, the balance being $H_2$ and $H_2O$.

TABLE

| Temperature (°F.) | 1200 | 1250 | 1300 | 1350 | 1400 |
|---|---|---|---|---|---|
| Temperature (°C.) | 649 | 677 | 704 | 732 | 760 |
| Time (Hours) | 12 | 12 | 12 | 12 | 12 |
| Fe Total | 85.11 | 85.42 | 86.62 | 88.49 | 92.70 |
| Fe Metallic | 76.21 | 77.70 | 79.03 | 83.91 | 87.04 |
| % Metallization | 89.50 | 91.00 | 91.20 | 94.80 | 93.90 |
| % Total Carbon | 8.60 | 9.24 | 8.96 | 6.31 | 2.02 |
| % Graphite Carbon | 2.89 | 3.42 | 2.82 | 2.06 | 0.46 |
| % Carbide Carbon | 5.71 | 5.82 | 6.14 | 4.25 | 1.56 |
| % $Fe_3C$ | 85.42 | 87.06 | 91.85 | 63.58 | 23.34 |

Changes in the carburization of direct reduced iron affect the burden temperature. Carbon can be added to the reduced iron in the reducing zone as iron carbide derived from $CH_4$ and/or $CO$. Carbon from $CH_4$ is endothermic, while carbon from $CO$ is exothermic. Therefore, an increase of $CH_4$ or $CO_2$ in the bustle area of the reduction furnace will reduce bed temperature. Conversely, a decrease in bustle $CH_4$ or $CO_2$ will raise bed temperature. When the burden temperature becomes too high, the material begins to agglomerate. However, a burden temperature that is too low will retard the rate of reduction and reduce furnace efficiency.

Several parameters affect product carburization. Decreasing the bustle, or reducing, gas temperature increases the carburizing potential and the amount of carbon in the reducing zone of the furnace. Carburizing potential increases as the temperature of the reducing gas decreases. The calculation is based on cooling the reducing gas from 1400° F. (760° C.) without considering methanation reactions in the equilibrium calculation. This is a valid assumption, particularly at lower temperatures, because of the considerably increased carburizing potential of carbon monoxide in the reducing gas as it cools. It should be noted that little carburizing will occur at temperatures below 932° F. (500° C.) because reaction kinetics are too slow.

Increasing the methane concentration in the reducing gas introduced into the furnace through inlet 34 and the bustle and tuyere system 18, 20 increases the carburizing potential in the reducing zone. As it cools the bed, this gas will react with the iron to form iron carbide. Experience has shown that a 0.1 percent increase in methane concentration of the bustle gas will increase the carbon content of the Midrex direct reduced iron product about 0.1 percent, at a constant production rate.

The addition of too much bustle $CH_4$ will cause the burden temperature to drop unacceptably low. As a result, metallization will drop unless the production rate is reduced. Depending on other parameters such as cooling zone upflow, the upper limit is probably about 4.5 to 5.0 percent $CH_4$ in the bustle gas before productivity is affected. Most plants operate at 2.5 to 3.5 percent bustle gas $CH_4$.

Lowering the bustle $CH_4$ content too severely can very rapidly overheat the bed and cause severe clustering. The lower safe operating limit is whatever enrichment will prevent methanation, perhaps as low as 2 percent. Reduction of the bustle $CH_4$ also causes product carbon to drop below the desired level. To protect the catalyst from carbon deposition, the amount of $CO_2$ in the reformed gas should not be permitted to drop below 2 percent.

There is a limit to the range of methane concentration in the bustle gas without adversely affecting the temperature of the bed. Therefore, it is necessary to employ a combination of control of bustle gas methane concentration and methane addition to the cooling zone via sensors 48 and 50 and valves 54 and 56 to regulate carburizing potential.

The introduction of methane, mixed with the cooling gas, into the cooling zone has an effect identical to that occurring in the reducing zone in the same temperature range. By adding methane to the cooling zone and allowing a controlled quantity of cooling gas to flow upwardly from the cooling zone, higher product carbon is obtained. When this gas flows upwardly through the top portion of the cooling zone, the gas becomes hotter, thus accelerating the carbon deposition reactions.

Depending on other parameters such as cooling zone upflow, cooling zone bleed, and enrichment, the cooling zone $CH_4$ may be as high as 50 percent. The cooling zone is a closed loop recirculating system. Any gas injected into the closed recirculating loop necessarily must force an equal volume of gas out of the loop at some other place. Therefore, if methane is injected into the loop, an equal amount of gas must leave the loop (e.g. at the cooling zone bleed or by upflow into the reducing zone). The gas analysis in a closed loop is determined by the percent of gas injected that is methane and the percent that is seal gas (e.g. if 50 SCFM methane and 50 SCFM seal gas are injected, the percent $CH_4$ is about 50 percent.) Lower limits of cooling zone $CH_4$ and carburizing gas $CH_4$ are set by the minimum acceptable amount of carbon in the product. Cooling zone methane is typically 20 to 50 percent, and carburizing gas methane is less than 10 percent.

Increasing the quality, or the $CO/CO_2$ ratio, in the gas in the reducing zone increases carbon from the Boudouard reaction. The ratio can be raised by increasing the quality of the gas exiting from the reformer 32. Thus, increasing the quality of the bustle gas increases its carburizing potential. The quality may be increased by lowering the reformed gas $CO_2$ content. Varying the quality is not normally used for carbon control because the capacity of the Midrex reformer varies inversely with the quality of reformed gas at a fixed methane leakage, and it is desirable to operate with maximum reformer capacity.

The $H_2/CO$ ratio of the reducing gas also affects the carburizing potential of the gas in the reducing zone of the furnace. Gases with high $H_2/CO$ ratios have lower carburizing potentials than those with low $H_2/CO$ ratios. This inhibition results from the combination of the water gas shift reaction $$(H_2O + CO \rightarrow CO_2 + H_2)$$

and the Boudouard carbon reaction $$(2CO \rightarrow CO_2 + C).$$

The additional water required to increase the $H_2/CO$ ratio maintains a $CO_2$ concentration that inhibits the formation of carbon.

The presence of water vapor in the cooling zone gas reduces carburizing potential in the cooling zone. Increasing the temperature of the cooling water to the cooling gas scrubber 24 in order to increase water vapor concentration very effectively reduces carbon. Water removes carbon in the cooling zone by the same mechanism that water inhibits carbon in the reformer $$(C + H2O \rightarrow H_2 + CO).$$

Another variable that affects product carbon is the type and size of iron oxide used. It is much easier to carburize some ores than others because of the specific physical and chemical properties of each raw material source. Factors such as pore size, surface area, and trace constituents of the particulate metal oxide material will also affect the degree of product carburization. Over 90 percent formation of iron carbide is achieved when the reducing zone temperature is maintained at from about 1200° to about 1310° F. (about 649° to 710° C.) and the process gas is used on Mutuca lump of a size $\frac{1}{4}" \times \frac{1}{2}"$ (0.64 × 1.27 cm) for 15 hours. Metal oxide material with larger lump sizes may require a longer residence time within the shaft furnace in order to achieve similar results.

The kinetics and equilibria of the carbon-depositing reactions are temperature dependent. Thus, each of the temperatures at the bustle, and the cooling zone or carburizing bustle, will affect product carburization.

The concentrations of each of the reactable constituents, i.e. CO, $CO_2$, $CH_4$, $H_2$, $H_2O$ and will affect the extent of the carbon-depositing reactions in the reducing, and cooling or carburizing zones. Given the burden temperature and the gas analyses, the water gas shift reaction directly or indirectly affects the relative concentrations of each of the reactable constituents.

The oxide feed, bustle temperature, $H_2/CO$ ratio, and reformed gas $CO_2$ are largely controlled by other plant operating criteria. The most effective carbon-controlling techniques currently practiced are to add controlled amounts of methane to the bustle gas and to the cooling zone or carburizing gas.

ALTERNATIVE EMBODIMENTS

Figure 2:
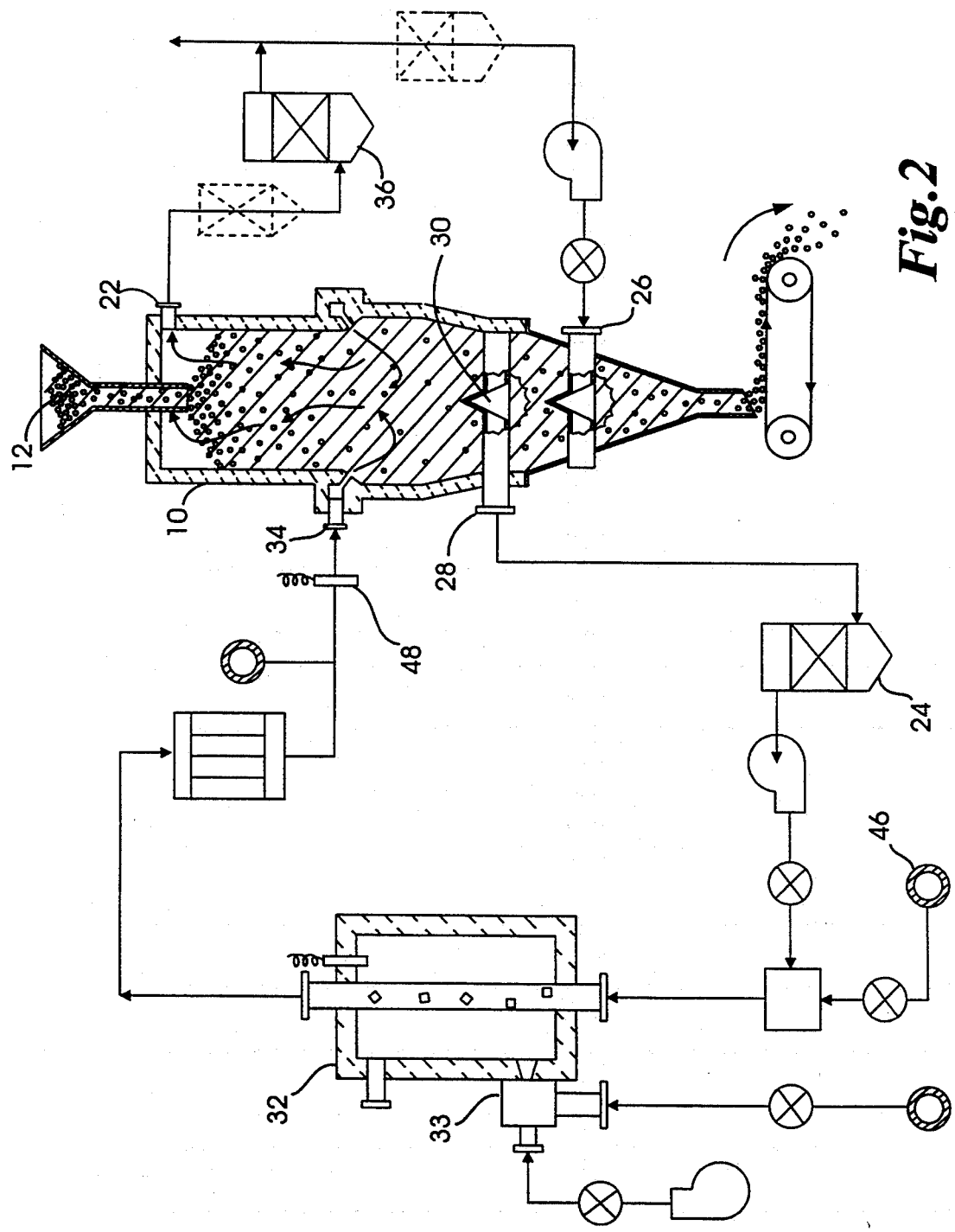
FIG. 2 is a schematic drawing of a vertical shaft furnace and its associated equipment showing an alternative method of production of iron carbide in a shaft furnace.

An alternative method of iron carbide production is shown in FIG. 2. A portion of the cooling gas that is introduced into the furnace through inlet 26 is removed from the furnace at outlet 28. This removed cooling gas is cooled by scrubber/cooler 24 and then introduced to the reformer 32 for reforming into reducing gas for reintroduction into the shaft furnace through inlet 34.

The spent top gas is removed from the furnace via outlet 22 and is cooled by scrubber/cooler 36. A portion of this cooled removed top gas is then reintroduced into the furnace as cooling gas through inlet 26.

SUMMARY OF THE ACHIEVEMENT OF THE OBJECTS OF THE INVENTION

From the foregoing, it is readily apparent that we have invented an improved method for iron carbide production in a direct reduction shaft furnace, and more particularly a method of using carbon containing reducing gas as the process gas in a furnace for producing iron carbide. By using this process, iron carbide can be produced faster and more economically than heretofore has been possible.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A process for producing an iron carbide ($Fe_3C$) product in a shaft furnace, comprising:

(a) establishing a gravitational flow of particulate metal oxide material by charging a generally vertical shaft furnace having an upper reducing zone and a lower cooling zone with particulate metal oxide material;

(b) introducing a reducing gas into the furnace intermediate the upper and lower zones at a temperature sufficient to promote a reducing reaction between the reducing gas and the metal oxide material;

(c) causing the reducing gas to move upwardly and countercurrently through the downward flow of metal oxide material, thereby reacting with and reducing a portion of the metal oxide and forming a top gas at the upper portion of the furnace;

(d) removing the top gas from the upper portion of the furnace;

(e) maintaining the temperature of the metal oxide material in the reducing zone from about 1200° to about 1400° F. (about 649° to about 760° C.);

(f) containing the metal oxide material within the shaft furnace reducing zone for a residence time of from about 9 to about 15 hours;

(g) introducing a cooling gas near the cooling zone of the furnace; and (h) removing the resulting metallized product from the bottom of the furnace.

2. The process of claim 1 wherein the reducing gas comprises not less than about 30 percent CO by volume.

3. The process of claim 1 wherein the reducing gas comprises not more than about 5 percent $CO_2$ by volume.

4. The process of claim 1 wherein the reducing gas comprises not less than about 2 percent $CO_2$ by volume.

5. The process of claim 1 wherein the reducing gas comprises from about 2 to 5 percent $CO_2$ by volume.

6. The process of claim 1 wherein the reducing gas comprises from about 2 to 5 percent $CH_4$ by volume.

7. The process of claim 1 wherein the reducing gas comprises from about 2.5 to 3.5 percent $CH_4$ by volume.

8. The process of claim 1 wherein the reducing gas consists essentially of CO, $CO_2$, $CH_4$, $H_2$, and $H_2O$.

9. The process of claim 1 wherein the reducing gas comprises, by volume, about 36 percent CO, about 5 percent $CO_2$, about 4 percent $CH_4$, the balance being $H_2$ and $H_2O$.

10. The process of claim 1 further comprising introducing excess cooling gas to the cooling zone, and removing only a portion of the cooling gas from the furnace at a location intermediate the reducing zone and cooling zone, thereby causing the remainder of the cooling gas to flow upwardly through the flow of metal oxide material and react to reduce the metal oxide material.

11. The process of claim 1 further comprising the step of cooling the removed top gas.

12. The process of claim 11 further comprising adding at least a portion of the cooled removed top gas to the cooling gas prior to step (g).

13. The process of claim 11 further comprising adding at least a portion of the cooled removed top gas to the reducing gas prior to step (b).

14. The process of claim 10 further comprising cooling the removed cooling gas and adding at least a portion of the cooled removed cooling gas to the reducing gas prior to step (b).

15. The process of claim 10 further comprising cooling the removed cooling gas and reintroducing the cooled removed cooling gas into the furnace as cooling gas.

16. The process of claim 1 further comprising adding $CH_4$ to the cooling gas prior to step (g).

17. The process of claim 16 wherein the cooling gas of step (g) contains not more than about 50 percent $CH_4$ by volume.

18. The process of claim 16 wherein the cooling gas of step (g) contains from about 20 to 50 percent $CH_4$ by volume.

19. The process of claim 6 further comprising controlling the amount of $CH_4$ in the reducing gas.

20. The process of claim 19 further comprising adding $CH_4$ to the cooling gas prior to step (g).

21. The process of claim 20 further comprising controlling the amount of $CH_4$ in the cooling gas.

22. The process of claim 21 further comprising controlling the amount of $CH_4$ in the reducing gas to not more than 5 percent by volume and controlling the amount of $CH_4$ in the cooling gas to not more than 50 percent by volume.

23. The process of claim 1 wherein the temperature of the metal oxide material in the reducing zone of the furnace is maintained at about 1290° F. to about 1310° F. (about 700° C. to about 710° C.).

24. The process of claim 1 wherein the residence time of the metal oxide material within the reducing zone of the shaft furnace is about 12 hours.

25. The process of claim 1 wherein the temperature of the reducing gas at its point of introduction into the furnace is from about 1150° to about 1450° F. (about 621° to about 788° C.).

* * * * *